June 30, 1925.
W. H. SCHOONMAKER
COMBUSTION ENGINE ATTACHMENT
Filed Nov. 17, 1922
1,543,681
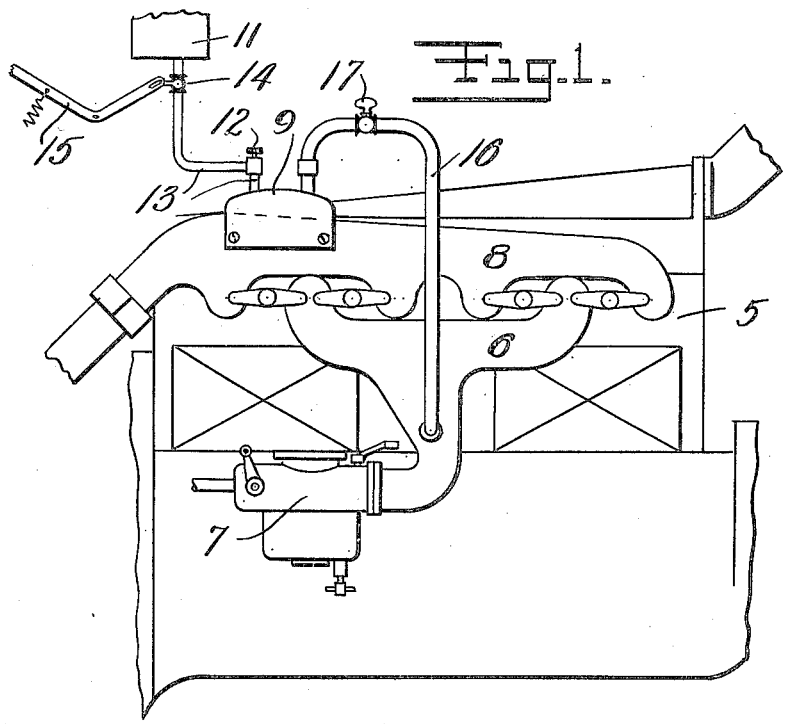
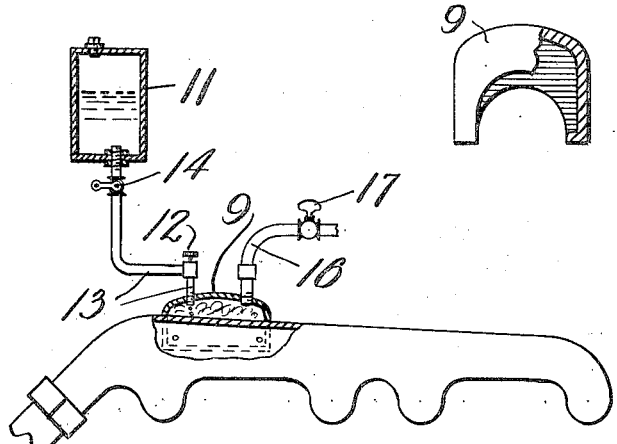
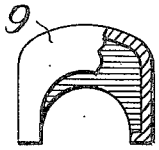
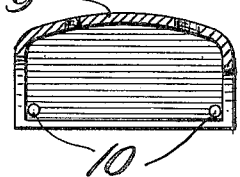

Patented June 30, 1925.

1,543,681

UNITED STATES PATENT OFFICE.

WILLIAM H. SCHOONMAKER, OF MONTCLAIR, NEW JERSEY.

COMBUSTION-ENGINE ATTACHMENT.

Application filed November 17, 1922. Serial No. 601,516.

*To all whom it may concern:*

Be it known that I, WILLIAM H. SCHOONMAKER, a citizen of the United States, residing at Montclair, in the county of Essex and State of New Jersey, have invented certain new and useful Improvements in Combustion-Engine Attachments, of which the following is a specification.

This invention relates to explosion engines, and more particularly aims to provide a novel and improved apparatus for association with an engine including a source of liquid hydrocarbon fuel, an explosion chamber, a conduit leading from such source to the explosion chamber, and a vaporizer, interposed in said conduit; the new apparatus including essentially a steam generator and means for transferring the steam generated therein to the explosive mixture before such mixture reaches the explosion chamber.

The objects of the invention include the provision of a special construction for the generator, permitting a special mode of operation thereof; the provision of a novel method of control of the delivery of water to the generator, and a novel combination of parts whereby this control is obtained and in turn an automatic control is had of the rate of steam delivery from the generator to the explosion chamber of the engine by way of the conduit in which the hydrocarbon vaporizer is interposed; and the provision of a complete combination which may be manufactured at a truly nominal cost and easily and quickly attached to any standard type of automobile engine, especially one of the multi-cylinder type such as used in automobiles.

It is well known that such engines usually employ gasoline as the hydrocarbon liquid; this liquid to be subsequently vaporized and mixed with air by a carburetor for timed admission to the engine cylinders.

In connection with various engines of the explosion type, it has heretofore been proposed to introduce steam into a cylinder during the power stroke, so as to provide a combustion prolonging element to lengthen out the thrust of the explosion relative to the stroke of the piston.

The present invention incidentally secures this advantage, and other advantages of equal if not greater importance. The present invention is based on the discovery that unexpectedly high efficiency is attained, when steam, as contradistinguished from watery vapor resulting from the excessive agitation of a collection of water brought about by mechanical means or by pneumatic means not generated thermally, is admitted into an engine cylinder as an intimate part of the mixture of gasoline vapor and air, that is, is admitted to the cylinder through a single inlet valve for all the components of the explosive fuel. The steam supply of the present invention is preferably admitted to the conduit including the carburetor or the like, and is preferably admitted to such conduit between carburetor and engine cylinder, thereby to enter the cylinder as soon as or sooner than the other two components of said fuel.

An important feature of the invention is a combination and arrangement of parts whereby the water may be delivered from a reservoir to the generator in such a way and at such a rate that water in other than the steam state may not accumulate in the generator, and whereby the rate of discharge of the reservoir governs directly, practically the percentage of steam forming a component of the explosive mixture at the instant of admission of the latter to the engine cylinder.

The invention will be more clearly understood from the following description, when taken in connection with the accompanying drawing, showing, illustratively, and as one example of how the invention may be carried out, a preferred embodiment thereof. It will be understood, of course, that the detailed description to follow is merely pertinent to the specific embodiment of the drawing, and that the scope of protection to be granted is indicated by the appended claim.

In said drawing, in which like characters of reference are applied to like parts, Figure 1 is a side elevation of a conventional multi-cylinder internal combustion engine of the automobile type, equipped with said embodiment as a readily applicable attachment;

Figure 2 is a replica of Figure 1, except that only the exhaust manifold of the engine is shown and certain of the parts are partially broken away and partially in section;

Figure 3 is an end elevation of the generator roof-hood, partially broken away and partially in section; and Figure 4 is a longitudinal vertical section through the member of Figure 3.

As will be seen from the drawing, the conventional engine illustratively disclosed includes a plurality of cylinders hidden from view in a cylinder-casting 5 and served at their usual (but not shown) inlet-valves by means of an inlet-manifold 6 having a carburetor 7 interposed therein.

The exhaust manifold of this engine is seen at 8.

Referring now to the new apparatus constituting said embodiment, the steam generator includes a roof-hood 9, best shown in Figures 3 and 4, comprising a single hollow member which may conveniently be a casting. This roof-hood, with a part of the top wall of the exhaust manifold, forms the complete generator. Of this generator, said part of the top wall of the exhaust manifold is the hot-plate member, or steam generator proper. The entire generator is complete and attached when the roof-hood 9 is secured in place as illustrated, by any suitable means, as by way of the screw, rivet or pin-receiving apertures at its lower opposite side edges two of which apertures are marked 10 in Figure 4.

Above the generator is a water reservoir 11; and between reservoir and generator is a dripping means, as the needle-valve 12, interposed in a conduit 13. This needle valve, of any common construction, is manually adjustable, as by the upwardly projecting thumb-piece illustrated, to control the rate of drop-by-drop delivery of water from the reservoir onto the hot-plate of the generator; such adjustment being a checking adjustment, if desired, on another flow controlling element in said conduit 13. The last-mentioned controller is an automatically or manually operated valve 14, which may be either an adjustable or a shut-off valve. If automatically operated, the means employed may be any of the familiar speed-responsive actuators and so not needing special illustration in the drawing; if manually operated, the means employed may include linkage such as indicated at 15 and controlled from a pedal or the like in the operator's compartment of the motor car the engine of which is equipped with the apparatus now being described.

The only other element of said apparatus is a conduit 16 running from the generator to the inlet manifold 6 and communicating with the latter between carburetor 7 and the engine cylinders. This last-mentioned conduit may have interposed therein a valve 17, for "tuning up" the system by varying the steam delivery capacity of the conduit 16, to agree with peculiar atmospheric conditions, or for additionally positively cutting out the apparatus in damp, humid weather.

The operation of the apparatus thus described should be clear from the foregoing, although it may be specially pointed out that the drop-by-drop delivery from reservoir to generator, the merging of the conduit 16 with the inlet manifold between carburetor and cylinder, and the various valves provided, insure not only that the steam generated is used as fast as it is generated, but that the suction strokes of the cylinder pistons positively draw into the final explosive mixture to be admitted at the ordinary inlet valves, the precise quantity of the steam component best suited to the particular thermometric and barometric conditions of the moment, thereby to cause the high efficiency characteristic of the invention.

Inasmuch as many changes could be made in the above construction, and many apparently widely different embodiments of my invention could be made without departing from the scope thereof, it is intended that all matter contained in the above description or shown in the accompanying drawings shall be interpreted as illustrated and not in a limiting sense.

It is also to be understood that the language used in the following claim is intended to cover all the generic and specific features of the invention herein described and all statements of the scope of the invention which, as a matter of language, might be said to fall therebetween.

I claim:

A humidfying apparatus for an internal combustion engine comprising a water reservoir, a valve controlled water-dripping means fed thereby, an open-bottomed shallow receptacle having inlet and outlet openings in the top thereof adapted to snugly fit the top of the exhaust manifold of an internal combustion engine, said receptacle being served by the dripping means whereby the water supplied from the reservoir is converted into steam and conduits leading from the receptacle inlet and outlet to the explosion chamber of the internal combustion engine and to said dripping means respectively.

In testimony whereof I affix my signature.

WILLIAM H. SCHOONMAKER.